US007418405B1

(12) United States Patent
Utter et al.

(10) Patent No.: US 7,418,405 B1
(45) Date of Patent: Aug. 26, 2008

(54) INTERACTIVE TIME-LIMITED MERCHANDISING PROGRAM AND METHOD FOR IMPROVED ONLINE CROSS-SELLING

(75) Inventors: Brian Utter, Seattle, WA (US); Douglas Welzel, Sammamish, WA (US); Douglas Irvine, Seattle, WA (US); Dwayne Benefield, Issaquah, WA (US); David Liu, Seattle, WA (US); Jason Shaw, Livingston, NJ (US)

(73) Assignee: Amazon.com, Inc., Seattle, WA (US)

( * ) Notice: Subject to any disclaimer, the term of this patent is extended or adjusted under 35 U.S.C. 154(b) by 1069 days.

(21) Appl. No.: 10/445,398

(22) Filed: May 23, 2003

(51) Int. Cl.
*G06Q 30/00* (2006.01)
*G06F 17/30* (2006.01)
*G07F 7/00* (2006.01)

(52) U.S. Cl. .......................................... 705/26; 705/27

(58) Field of Classification Search .................. None
See application file for complete search history.

(56) References Cited

U.S. PATENT DOCUMENTS

| | | | | |
|---|---|---|---|---|
| 4,674,041 A | * | 6/1987 | Lemon et al. | 705/14 |
| 6,138,106 A | * | 10/2000 | Walker et al. | 705/14 |
| 6,377,935 B1 | * | 4/2002 | Deaton et al. | 705/14 |
| 6,506,118 B1 | * | 1/2003 | Baerlocher et al. | 463/25 |
| 6,865,545 B1 | * | 3/2005 | Epstein et al. | 705/14 |
| 6,954,732 B1 | * | 10/2005 | DeLapa et al. | 705/14 |
| 7,136,829 B2 | * | 11/2006 | Hellal et al. | 705/26 |
| 7,225,142 B1 | * | 5/2007 | Apte et al. | 705/14 |
| 7,257,545 B1 | * | 8/2007 | Hung | 705/14 |
| 2001/0034654 A1 | * | 10/2001 | Vigil et al. | 705/14 |
| 2002/0095333 A1 | * | 7/2002 | Jokinen et al. | 705/14 |
| 2003/0069785 A1 | * | 4/2003 | Lohse | 705/14 |
| 2003/0074323 A1 | * | 4/2003 | Catan | 705/59 |
| 2005/0080671 A1 | * | 4/2005 | Giraud et al. | 705/14 |

(Continued)

FOREIGN PATENT DOCUMENTS

| WO | WO 00/60516 A2 | 10/2000 |
|---|---|---|
| WO | WO 01/06424 A2 | 1/2001 |

OTHER PUBLICATIONS

Paul, Cynthia A. "TV stars heat up scree. (OVC's cookware marketing strategies)". HFD-The Weekly Home Furnishings Newspaper, vol. 67, No. 47, p. 34(2). Nov. 21, 1994.*

(Continued)

*Primary Examiner*—Matthew S Gart
*Assistant Examiner*—John Shin
(74) *Attorney, Agent, or Firm*—Christensen O'Connor Johnson Kindness PLLC

(57) ABSTRACT

An interactive merchandising program includes two or more program segments that are organized in a series. Each program segment in the series includes at least one time-limited offer for sequential presentation to the customer. The customer is required to undertake some action with respect to each program segment without knowing the identity of offers in program segments yet to be presented. If an offer is accepted within the time limit of the offer, the merchandising program terminates and the customer's acceptance of the offer is processed. If the customer declines a presented offer, the offer is withdrawn. The merchandising program proceeds to the next program segment in which the customer is presented the next time-limited offer. In this manner, the customer is provided an interactive experience that invites considered decision-making on the part of the customer.

105 Claims, 7 Drawing Sheets

U.S. PATENT DOCUMENTS

2005/0222906 A1* 10/2005 Chen .......................... 705/14
2006/0136306 A1* 6/2006 Rothman et al. .............. 705/26
2007/0022010 A1* 1/2007 Blaser et al. ................. 705/14
2007/0150334 A1* 6/2007 Bergh et al. .................. 705/10

OTHER PUBLICATIONS

Slatalla, Michelle. "Online Shopper: A Path to Redemption (Limited Time Offer)" (abstract) New York Times, col. 1, p. 4, Section G. Thursday, Jun. 21, 2001.*

* cited by examiner

INTERACTIVE TIME-LIMITED MERCHANDISING PROGRAM AND METHOD FOR IMPROVED ONLINE CROSS-SELLING

FIELD OF THE INVENTION

The present invention relates to merchandising of products and services, and more particularly relates to online merchandising.

BACKGROUND OF THE INVENTION

Electronic commerce is becoming an increasingly popular way of conducting business. Customers are now able to identify and purchase a wide variety of goods and services over computer networks, including the Internet. While electronic commerce is increasing in popularity, many customers tend to limit their purchase of goods and services to certain categories, such as books and movies. Customers who are accustomed to purchasing goods in these certain categories are reluctant to expand their online shopping experience by purchasing goods and services in other categories, such as garden tools or kitchen and housewares, for example.

Companies offering online merchandising of goods and services are interested in helping their customers recognize the wide array of products and services that are available for purchase. The problem experienced by these companies is how to encourage customers to expand their purchasing comfort level to include goods and services in categories which they have previously not purchased. The present invention is directed to a computer-implemented method and system that improves the customer's shopping experience and assists the customer in discovering a wider universe of goods and services available for purchase.

SUMMARY OF THE INVENTION

The present invention provides interactive merchandising programs that, in preferred embodiments, are particularly suited for improved online cross-selling of goods and services. In one embodiment, the invention provides a system for presenting an interactive time-limited merchandising program to a customer. The merchandising program includes two or more program segments that are organized in a series. Each program segment in the series includes at least one time-limited offer for presentation to the customer. The offers in the program segments are sequentially presented to the customer. For each program segment in the series, the customer is required to undertake some affirmative action with respect to the program segment. For instance, the customer may be required to decide whether to accept a presented offer without knowing the identity of offers in program segments yet to be presented. If a presented offer is accepted by the customer within the time limit of the offer, the merchandising program terminates and the customer's acceptance of the offer is allowed to be processed. If the customer declines a presented offer, the offer is withdrawn. The merchandising program then proceeds to the next program segment in which the customer is presented the next time-limited offer.

In this manner, the customer is provided an interactive experience that invites considered decision-making on the part of the customer. In the foregoing embodiment, the customer decides whether to accept or decline the presented offer without knowing whether an offer in the next program segment will be more desirable. If the customer declines the last offer in the merchandising program, and no program segment in the series remains, the merchandising program is terminated. In a preferred embodiment of the invention, once the program is terminated for a particular customer, the customer cannot initiate a new merchandising program for a specified period of time, e.g., one program per day.

As already noted, a customer's ability to accept a presented offer is preferably limited to a defined period of time. If the time limit of a presented offer has expired without the offer being accepted by the customer, the offer is withdrawn and can no longer be accepted. Preferably, the time limit of an offer is long enough to enable the customer to investigate the product or service subject to the offer, but short enough that it requires some urgency on the part of the customer to determine whether to accept or decline the offer.

A merchandising program of the invention may include program segments that are prepared "on the fly," e.g., while a customer is viewing a presented offer and determining whether to accept or decline the offer, the merchandising program is generating the next program segment. Accordingly, program segments in the series may be prepared after an offer in an earlier-prepared program segment has been presented to a customer. Alternatively, the segments in a merchandising program may be prepared and organized all at one time. Thus, when a customer is presented an offer in the first program segment, the remaining program segments are already defined (but unknown to the customer).

When preparing a program segment, an offer to be associated with the program segment may be selected from a pool of available offers. Selection of an offer may be based on information pertaining to the customer, such as the customer's prior purchase history, a customer's "wish list", and/or a customer's shopping history. The pool of available offers may be maintained in a merchant computer system and may change as often as desired. Furthermore, the probability of a particular offer in the pool of available offers being selected for a program segment may be adjusted by the merchant. In one aspect, the offers in the pool may be weighted so as to vary the probability that a particular offer will be selected. The weight assigned to an offer is preferably adjustable, e.g., based on customer information or on preferences of the merchant.

Another aspect of the invention includes defining multiple classes, or categories, and identifying one or more offers in the pool of available offers as pertaining to at least one class in the multiple classes. For example, a pair of jeans may be identified as belonging to an "apparel" class of goods while pruning shears may be assigned to a "garden" class of goods. Weights may be assigned to offers in the pool of available offers based on information pertaining to the customer and the class to which the offer pertains. Accordingly, the probability of selection of some goods (e.g., goods not normally purchased by the customer) may be set higher than other goods. Weights may also be assigned to each class in the multiple classes, which weights affect the probability that offers pertaining to each of the respective classes will be selected for presentation to the customer. A class of goods or services may thus be favored over another class in terms of probability of selection.

In another aspect, the pool of available offers may be configured to exclude offers that do not meet a defined criterion. One such criterion may be a time frame in which the offer, if accepted, can be fulfilled. Other criteria may relate to a type of product or service or a class of product or service.

In yet another aspect, a merchandising program prepared according to the invention may include one or more interstitial segments in the series of program segments. An interstitial program segment is preferably configured to present interstitial information to a customer and solicit a customer response. For example, interstitial information may include a query to the customer regarding one or more offers or classes of offers the customer would like to receive. Alternatively, interstitial information may include a query asking whether the customer would like to preview an offer in a program segment yet to be presented, or whether the customer would like to reactivate an offer in a program segment that was previously presented but declined. Choices may be given to the customer, including choices that allow the customer to decide the class of an offer that he or she would like to preview, or allow the customer to select the previously presented program segment that he or she would like to reactivate.

An offer presented in a program segment may take a wide variety of forms. In one form, an offer may be for a particular good or service. In another form, an offer may be comprised of a good or service associated with a particular merchandising benefit, such as free shipping, reduced price, percentage off regular price, etc. In yet another form, the offer may simply be a merchandising benefit. Where the offer is a reduction of price of a product or service, for example, the offer may be further configured to enable the customer to select the product or service that is to be subject to the offer. An unlimited or limited set of products or services may be presented to the customer for application of the merchandising benefit in the offer.

In yet another aspect of the invention, the number of times that an offer is presented to customers may be limited. In that regard, the invention includes counting the number of times that an offer is presented to customers, and after the offer has been presented a determined number of times to customers, the offer is thereafter excluded from presentation to further customers.

In still another aspect of the invention, a limit may be placed on the number of times a particular product or service may be offered and accepted by customers. In that regard, the invention includes counting the number of times an offer for the particular product or service is accepted. Once an offer for the product or service has been accepted by customers a determined number of times, the offer is thereafter excluded from presentation to further customers.

Other aspects of the invention include features such as enabling the customer to transfer a presented offer to another party for possible acceptance by the other party. In one embodiment, the other party may be required to accept or decline the offer within the original time limit given to the transferring customer. Alternatively, the other party may be presented with a new time limit that is initiated once the other party views the transferred offer.

In all cases, it should be understood that the aspects, features, and embodiments discussed above are only exemplary and are in no way intended to limit the scope of the invention to any specific description herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF A PREFERRED EMBODIMENT

Computer networks are well known in the field of communications. Computer networks may include communication links that extend over a local area or a wide area, or even be global, as in the case of computer networks forming the Internet. The present invention is described herein as using the Internet. Persons of ordinary skill in the art will recognize that the invention may also be used in other interactive environments that include local or wide area networks that connect merchants and customers for electronic commerce.

Prior to discussing the details of a preferred embodiment, it should be understood that the following description is presented largely in terms of steps and operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links.

Figure 1:
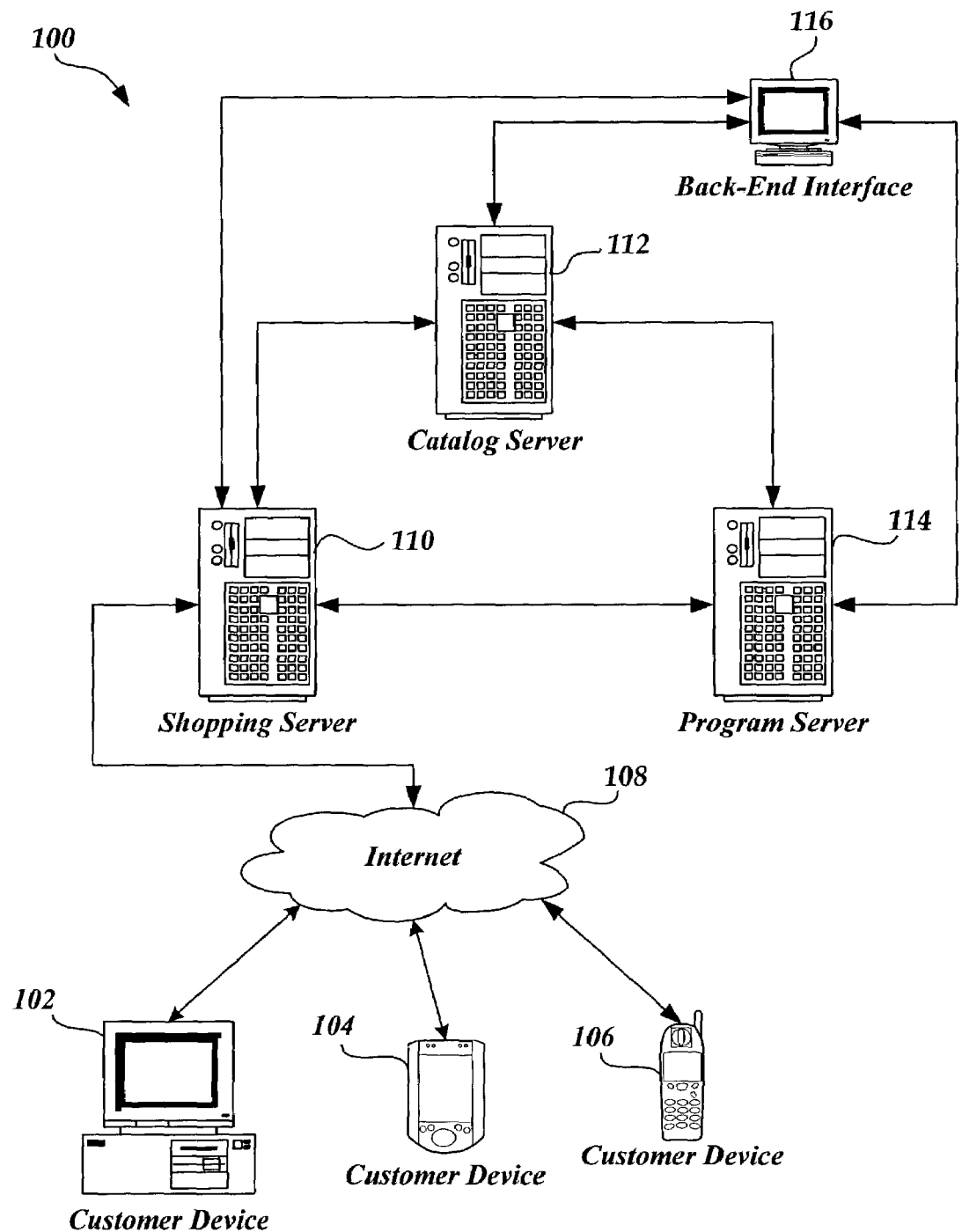
FIG. 1 is a pictorial diagram showing an environment for implementing one exemplary embodiment of the invention.

FIG. 1 illustrates a pictorial diagram of one environment for implementing an embodiment of the present invention. The environment shown in FIG. 1 includes a merchant system 100. The environment also includes various customer devices, such as a computer system 102, a PDA 104, and a wireless telephone 106. Each of the customer devices 102, 104, 106 is configured for communication with the merchant system 100. In the environment shown in FIG. 1, the customer devices 102, 104, 106 communicate with the merchant system 100 via the Internet, as depicted by a cloud 108. Protocols and components for communicating via the Internet are well known to those of ordinary skill in the art of computer communications.

The merchant system 100 is depicted in FIG. 1 as operating in a distributed computing environment comprising several computer systems that are interconnected using one or more computer networks. However, it will be appreciated by those of ordinary skill in the art that the system 100 could equally operate within a computer system having fewer or greater number components than are illustrated in FIG. 1. Thus, the depiction of merchant system 100 in FIG. 1 should be taken as exemplary, and not limiting to the invention.

The merchant system 100 includes a shopping server 110, a catalog server 112, and a program server 114. Each of the servers 110, 112, and 114, which will be described below in more detail, may be connected to a back-end interface 116 that allows the merchant to monitor and adjust the operation of the servers.

In brief, the shopping server 110 is generally responsible for providing front-end merchant communication with various customer devices, such as devices 102, 104, 106, via the Internet. The front-end communication provided by the shopping server 110 may include generating text and/or graphics, possibly organized as a Web page using hypertext transfer protocols, in response to information inquiries received from the various customer devices.

The shopping server 110 may obtain information on available products and services directly from the catalog server 112, as is done in conventional electronic commerce systems. The shopping server 110 may also obtain merchandising programs from the program server 114 to present to the customers in accordance with the present invention. As shown in FIG. 1, the program server 114 may communicate with the catalog server 112 to obtain information to be used in the merchandising programs that the program server 114 generates and provides to the shopping server 110.

Figure 5:
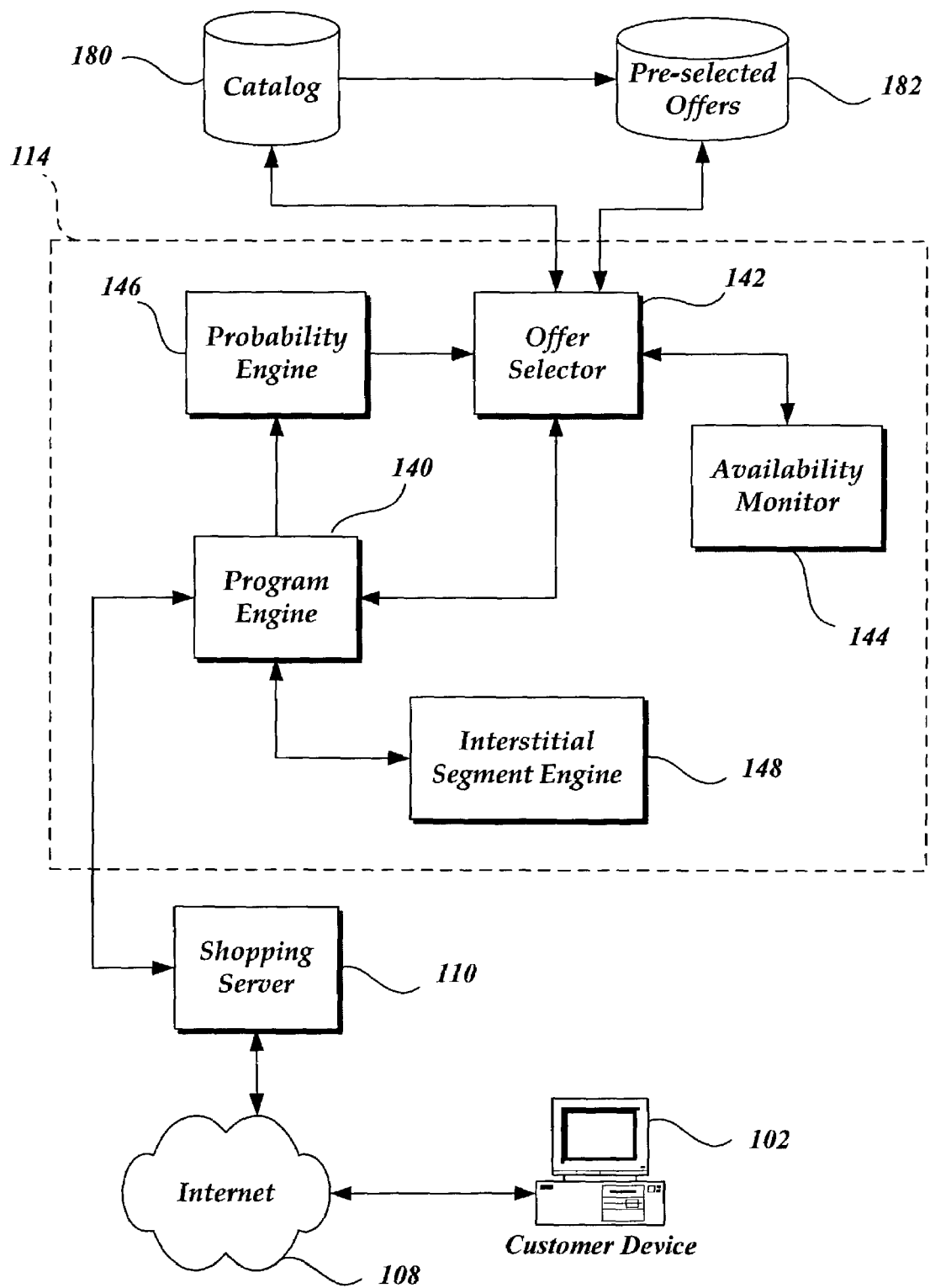
FIG. 5 is a block diagram depicting a logical arrangement of certain computer hardware and software for implementing the embodiment of the invention shown in FIGS. 1 and 3.

The catalog server 112, for its part, is generally responsible for maintaining a comprehensive catalog of the products and services that the merchant is making available to its customers. This catalog may be maintained in a conventional database stored in one or more memory storage devices within the catalog server 112. The catalog server 112 may also maintain a database with one or more pre-selected offers for use in a merchandising program, as shown in FIG. 5.

Merchandising programs prepared by the program server 114 are configured to include two or more program segments that are organized in a series for presentation to a customer. Each program segment in the series has at least one time-limited offer associated therewith for presentation to the customer. Three examples of interactive merchandising programs prepared in accordance with embodiments of the present invention are depicted graphically in FIGS. 2A-2C.

Figure 2A:
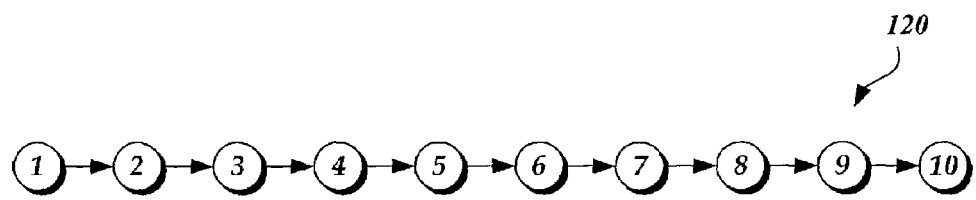
FIGS. 2A-2C are graphical depictions of interactive merchandising programs prepared in accordance with embodiments of the present invention.

Specifically, in FIG. 2A, a merchandising program 120 is shown as including ten program segments. These program segments are labeled "1" through "10". The offers associated with the program segments "1" through "10" are sequentially presented to a customer. For each offer in each program segment in the series, the customer is required to decide whether to accept the presented offer, typically without knowing the identity of offers yet to be presented in the remaining program segments.

For example, using the merchandising program 120, a customer is first presented with an offer associated with program segment "1." At this stage, the customer does not know the identity of offers that pertain to any of the remaining program segments "2" through "10." The customer is required to decide in a limited amount of time whether to accept or decline the presented offer. If the presented offer is accepted by the customer within the time limit of the offer, the merchandising program is immediately terminated and the customer's acceptance of the offer is allowed to be processed. After termination to the program, the identities of offers in the remaining program segments (that were not presented) are generally withheld from the customer. However, in alternative embodiments, the customer may be informed of the offers that were not presented.

In any event, if the customer declines a presented offer, the offer is withdrawn and the program server 114 proceeds to provide the next program segment to the shopping server 110, which presents the next offer to the customer. The process of presenting the next offer in the series of program segments continues each time the customer declines the presented offer until the last program segment (e.g., program segment "10" in FIG. 2A) is reached. If the offer in the last program segment is declined, and no program segment in the series remains, the merchandising program is terminated. Additional detail in regard to one exemplary method for preparing and presenting offers in a merchandising program is provided later in reference to FIG. 4.

Each offer that is presented to the customer preferably has a time limit in which the customer must determine whether to accept the offer. The time limit is generally initiated when the offer is first presented. In one embodiment of the invention, each offer has a time limit of 60 minutes, though other embodiments may have other time limits as desired. If the time limit of a presented offer has expired without acceptance by the customer, the shopping server 110 preferably withdraws the presented offer. In some embodiments of the invention, the program server 114 and shopping server 110 may automatically proceed to the next program segment in the merchandising program and present the next offer. In alternative embodiments, the merchandising program may simply remain at the current (expired) program segment and proceed to the next program segment only on receipt of input from the customer.

It is not necessary that all of the program segments of a merchandising program be prepared at any one time, e.g., prior to the first offer being presented to the customer. Accordingly, in one embodiment of the invention, the program server 114 may prepare only the first program segment before preparing any of the remaining program segments. The remaining program segments may be generated at any determined interval or upon receipt of initiating actions by the customer. For example, the program server 114 may be configured to prepare the next program segment only when the customer declines the offer in the current program segment. Preparing program segments "on the fly" in this manner is preferred in circumstances where the subject matter of offers that may be presented to the customer change rapidly (e.g., where the products and services or merchandising benefits kept in the catalog server 112, or the availability of those products or services or benefits, is frequently changing). Alternatively, some or all of the program segments of a merchandising program may be generated at one time before or concurrent with presenting an offer to the customer. This alternative may be preferred in circumstances where computer processing of the merchandising program is desired to be completed at a set instance of time or when the availability of products, services, or benefits is relatively static.

Figure 2B:
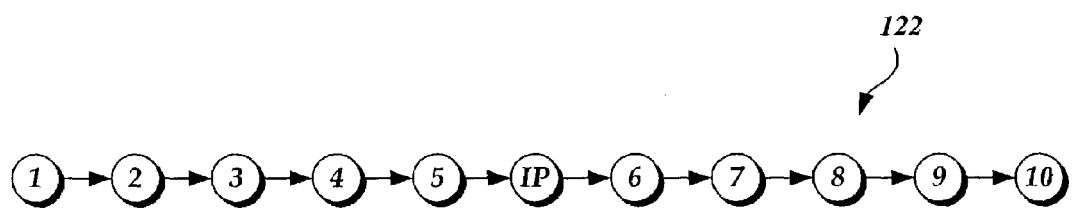

FIG. 2B illustrates another example of a merchandising program 122 prepared in accordance with the present invention. The merchandising program 122 is similar to the merchandising program 120 shown in FIG. 2A in that the program 122 includes ten regular program segments. However, the merchandising program 122 further includes an interstitial program segment inserted into the series of program segments. The interstitial program segment is identified by the letters "IP" and, in this example, is included in the series after program segment "5" and before program segment "6." The interstitial program segment is preferably configured so as to present interstitial information to the customer and solicit a customer response.

An interstitial program segment is one in which a product or service is not necessarily offered to the customer, but the customer is still required to take some action before proceeding to the next program segment. An interstitial program segment affords the merchant the opportunity to pose one or more queries to the customer, for example, that may improve the performance of the merchandising program for the customer, or provide additional incentives or benefits to the customer for engaging in the merchandising program.

For instance, in one embodiment of the invention, the information presented in an interstitial program segment may include a query to the customer asking about one or more offers that the customer would like to receive. A query of this type is particularly beneficial in merchandising programs where the remaining program segments are generated on the fly. By asking the customer whether he or she would like to receive an offer in a "health and beauty" category or "tools and hardware" category, for example, or to see one of "156 toasters" or "351 DVD players" in another example, one or more of the remaining offers may be tailored toward a product or service in the category or product type identified by the customer.

It should be noted that the merchant system 100 may be configured to store the customer's answers to the queries that are posed in interstitial program segments. In this regard, the customer's answers to the queries form part of the customer's shopping history with the merchant. By maintaining a record of the answers to the queries posed to the customer, the merchant obtains a greater understanding of the likes and dislikes of the customer. This knowledge can be used within the merchandising program, as described above, or outside of the merchandising program to more specifically identify and present products or services that are likely of greater interest to the customer. Customer information obtained as a result of interstitial segment queries are an important result of this aspect of the invention, and can be used to benefit the customer in other aspects of the merchant system 100, beyond the presentation of merchandising programs according to the invention.

In another embodiment of the invention, the interstitial information may include a query asking whether the customer would like to preview an offer that is to be presented in a future program segment. The opportunity to preview a future offer may include some or all of the information regarding the offer, or the preview may simply report a class, or category, to which the offer pertains. Thus, the opportunity to preview a future offer may serve as a teaser to encourage customers to continue with the merchandising program by showing one or more offers yet to come.

A preview of an offer may alternatively be configured to present the entire offer to the customer, along with an opportunity to accept the offer. This offer "preview" may be provided to the customer with or without the normal time limitation associated with regular offers. If the customer declines the "preview" offer at this juncture, the merchandising program 122 may continue with the remaining program segments and eventually present the actual offer that was previously "previewed" by the customer.

In yet another embodiment, the interstitial information may include a short survey for the customer to fill out. This survey may provide the merchant additional information about the customer so the merchant can provide the customer with a better, more relevant shopping experience. Games or other diversions requiring customer input may also be provided in an interstitial program segment for the enjoyment of the customer.

In still another embodiment, an interstitial program segment may include a query asking whether the customer would like to reactivate an offer that was previously presented and declined in an earlier program segment. The customer may have reconsidered passing up a previously-presented offer, and an interstitial program segment that allows the customer to reactivate the offer would be accepted. If the customer returns an affirmative response to the query, the previously presented offer is reactivated and presented to the customer. The time limit of the offer may be the same time limit that is given to other offers, or it may be a shortened or longer time limit, as desired.

In some embodiments, the interstitial program segment may be configured to enable the customer to select which of the previously presented offers he or she wishes to reactivate. Other embodiments may automatically select one of the previously presented offers and reactivate the offer for the customer. If the customer declines the reactivated offer, the offer is again withdrawn and the merchandising program proceeds to the next program segment.

Figure 2C:
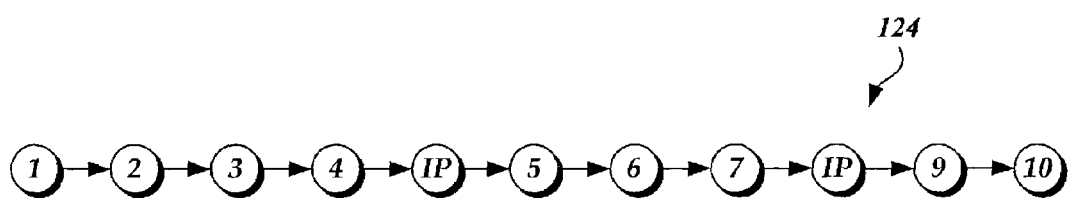

The program server 114 may include any number of interstitial program segments in a merchandising program. Moreover, the placement of the interstitial program segment is not necessarily limited to any particular place within the series of program segments. In FIG. 2B, the interstitial program segment "IP" is shown in the middle of the merchandising program 122 only as one example. FIG. 2C illustrates yet another example of a merchandising program 124 that includes two interstitial program segments.

FIG. 2C also illustrates another feature that may be incorporated into embodiments of the invention. In FIG. 2C, one of the interstitial program segments is not merely inserted into the series of program segments, but in fact replaces a program segment in the series. In the merchandising program 124, one interstitial program segment is shown taking the place normally occupied by program segment "8." The other interstitial program segment in FIG. 2C does not take the place of a regular program segment, but instead is inserted between program segments "4" and "5."

Again, it should be understood that the merchandising programs 120, 122, 124 shown in FIGS. 2A-2C are exemplary only, and do not serve to limit the invention. The programs shown include ten program segments, but any number of program segments may be provided in a merchandising program.

Figure 3:
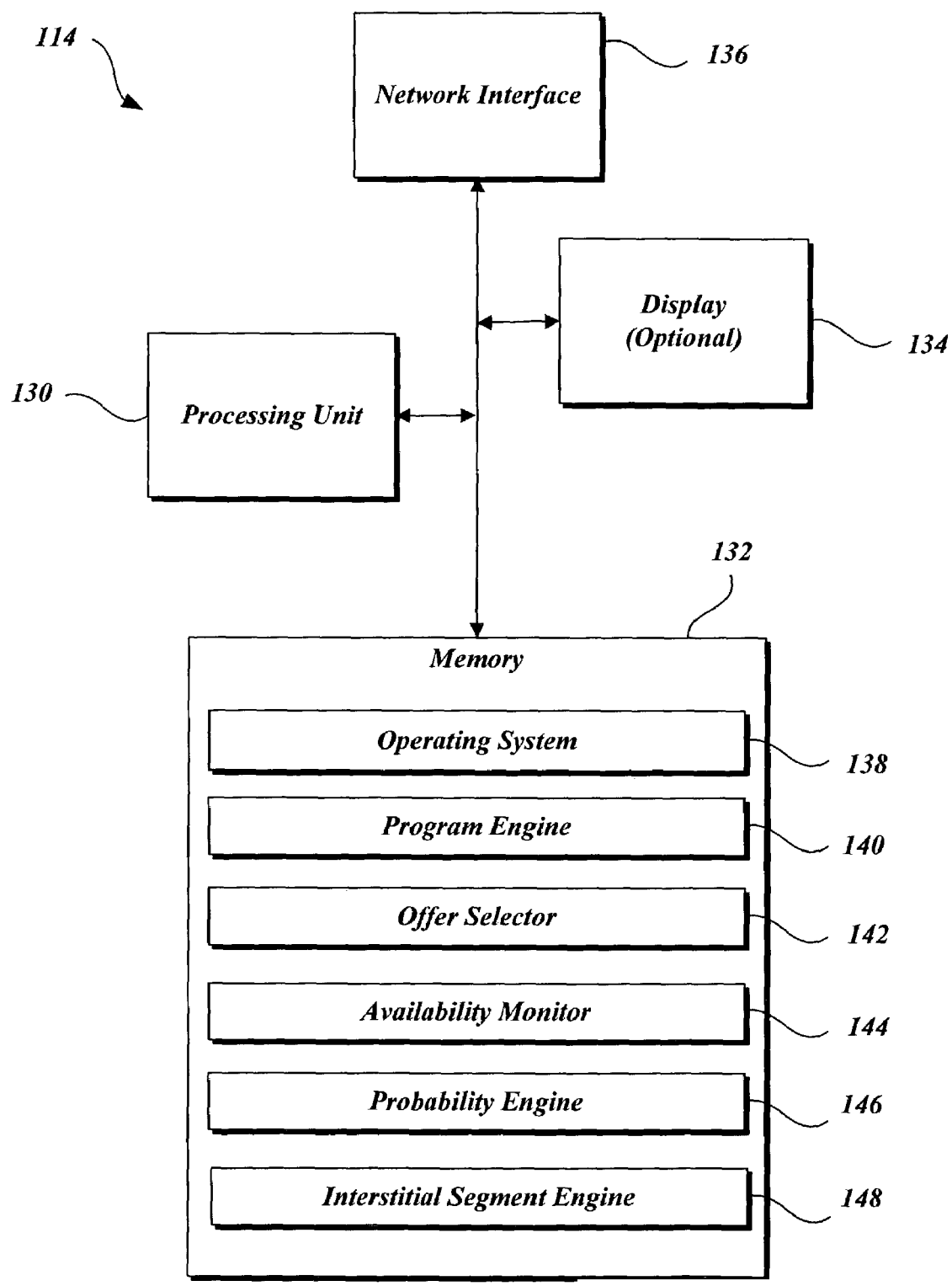
FIG. 3 is a block diagram depicting an arrangement of certain computer hardware and software for the program server shown in FIG. 1.

In the merchant system 100 shown in FIG. 1, the program server 114 is generally charged with the task of preparing the merchandising program to be presented to the customer via the shopping server 110. FIG. 3 is a block diagram that depicts an arrangement of computer hardware and software that may be used to implement the program server 114.

In FIG. 3, the program server 114 includes a processing unit 130, a memory 132, an optional display 134, and a network interface 136, all of which communicate with one another by way of a communication bus. A similar arrangement may be provided for the shopping server 110. The network interface 136 is preferably connected to one or more computer networks that connect to the other components in the merchant system 100. The processing unit 130 may thus receive information and instructions from the other computing components, such as the shopping server 110 and catalog server 112 via the network interface 136. The processing unit 130 may also communicate information to and from the memory 132, and further provide output information for the display 134. Other components not shown, such as a user input device, may be included in the program server 114 as well.

The memory 132 contains computer program instructions that the processing unit 130 executes in order to operate the program server 114. Similarly, a memory in the shopping server 110 contains computer program instructions that are executed by a processing unit in order to operate the shopping server 110. In the embodiment shown in FIG. 3, the memory 132 includes, for example, an operating system 138 that provides computer program instructions for use by the processing unit 130 in the general administration and operation of the program server 114. The memory 132 further includes computer program instructions for implementing features of the invention including program instructions that form a program engine 140, an offer selector 142, an availability monitor 144, a probability engine 146, and an interstitial segment engine 148. The operation of each of these features of the invention will be described in greater detail below, particularly in reference to FIGS. 4 and 5.

Figure 4:
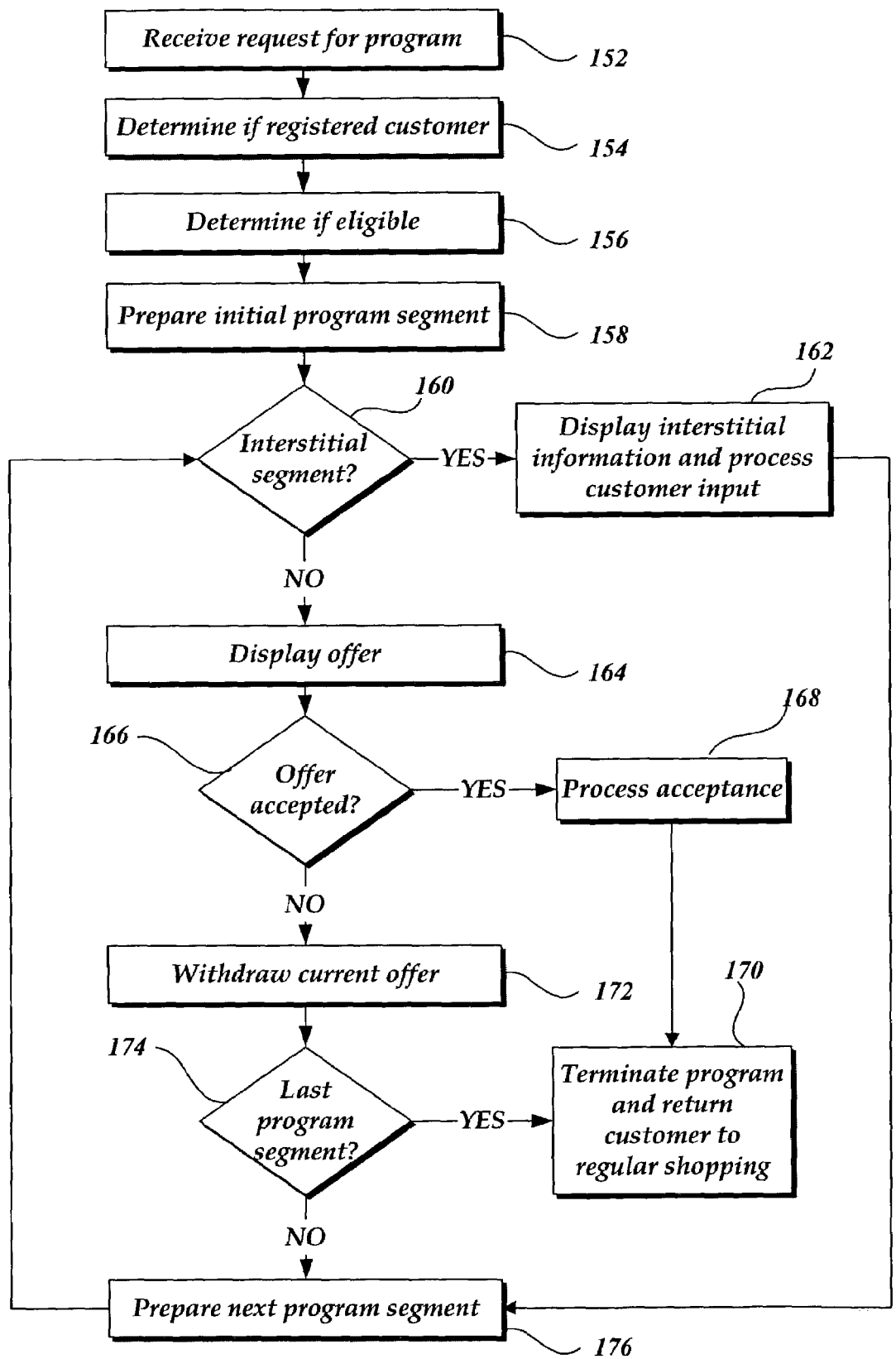
FIG. 4 is a flow diagram describing one embodiment of a process for presenting an interactive time-limited merchandising program to a customer.

To better understand the operation of the features of the invention shown in the memory 132 in FIG. 3, and their logical arrangement as shown in FIG. 5, it is worthwhile to first observe one example of a method that may be used to implement the present invention. FIG. 4 provides a flow diagram of one such method 150 that is set in the context of the environment shown in FIG. 1. The method 150 may be implemented as program instructions that are executed by one or more of the servers in the merchant system 100, such as the shopping server 110 and the program server 114. As to the program server 114, the program engine 140 is generally charged with the task of preparing merchandising programs for presentation to customers.

In FIG. 4, the method 150 begins at block 152 with receipt of a request for a merchandising program to be presented to a customer. The request for a merchandising program may be initiated by the customer using a customer device 102, 104, 106 (FIG. 1) that communicates with the shopping server 110. The shopping server 110 then passes the request to the program server 114. Alternatively, the shopping server 110 may itself initiate the request for a merchandising program as part of a shopping experience that the customer is presently having with the shopping server 110. In any event, the request for merchandising program is communicated to the program server 114. In regard to FIG. 3, the request for a merchandising program is received by the processing unit 130 of the program server 114 via the network interface 136. The computer program instructions that embody the program engine 140 are used by the processing unit 130 to prepare and provide the merchandising program as requested.

Returning to FIG. 4, it may be desired to determine first whether the customer requesting the merchandising program has previously registered with the merchant. Accordingly, at block 154 the program engine 140 determines whether the requesting customer is a registered customer, which can be done by accessing a database of registered customers stored in the memory 132 or elsewhere in the merchant system 100. In some circumstances, the merchant may wish to offer the merchandising programs only to registered customers. In doing so, the merchant may avoid problems with providing merchandising offers to non-customers such as automated robot programs that may be accessing the merchant's shopping server 110 and posing as actual prospective customers.

If it is determined that the requesting customer is registered, the merchant may also desire to employ a second level of criteria for determining whether to extend a merchandising program to the customer and, if a program is extended to the customer, determining the type of merchandising program. At block 156, the program engine 140 determines whether the registered customer is eligible according to the second level criteria to receive the merchandising program. For example, the merchant may wish to extend a merchandising program only to customers that have a prior purchase history with the merchant. In this regard, the merchant may reward prior customers. The merchant may also use information about the customer, such as the customer's prior purchasing or shopping history, to generate or select a particular merchandising program for the particular customer. For example, if the merchant knows that it is the customer's birthday, the merchant may elect to present a merchandising program that contains more or better offers than standard merchandising programs that would typically be presented to the customer.

If the program engine 140 determines the customer to be eligible, the program engine 140 proceeds to block 158 in which the program engine 140 prepares an initial program segment (e.g., program segment "1" as shown in FIGS. 2A-2C).

Part of the process of preparing a program segment is preparing the offer that is to be presented to the customer. An offer presented to the customer in a program segment may take a wide variety of forms. In one form, an offer may be for a particular good or service. In another form, an offer may be comprised of a good or service associated with a particular merchandising benefit, such as free shipping, reduced price, percentage off regular price, etc. In yet another form, the offer may simply be a merchandising benefit (e.g., a price reduction for an entire class of goods or services, such as "kitchen products"). An offer that involves a particular product or service or merchandising benefit may require selection of the product or service or benefit in order to be presented. While those of ordinary skill in the art will recognize numerous methods for selecting offers from a catalog, which may even be random, preferred embodiments of the invention use a selection process that tends to present to the customer offers outside the customer's prior shopping experience (e.g., for goods and services not previously purchased by the customer). For example, if the customer has not yet made a purchase of a garden product, some or all of the offers presented to the customer may be directed to discounts on garden products, such as rakes, gloves, seed, pots, etc. In this manner, the customer benefits by being given incentives to consider a broader range of goods and services than the customer might otherwise consider.

In the embodiment of the invention shown in FIGS. 3 and 5, the program engine 140 uses an offer selector 142, an availability monitor 144, and a probability engine 146 to conduct an offer selection process. The offer selector 142 is formed of computer program instructions stored in the memory 132 that, when executed by the processing unit 130, carry out the process of selecting the offer for the program segment being generated. The offer selector 142 may be interfaced to the program engine 140 in a manner that allows the program engine 140 to send a request to the offer selector 142 asking the offer selector 142 to identify and return an offer to the program engine 140.

The offer selector 142 is also preferably interfaced with the catalog server 112 (via the network interface 136 shown in FIG. 3) so as to have access to the catalog 180 of goods and services that the merchant is offering. The offer selector 142 may select offers from the entire catalog 180 of the merchant. Alternatively, the offer selector 142 may operate to store in a memory of the catalog server 112 (or program server 114) a subset of pre-selected offers 182 from the catalog server 112 that are available for a merchandising program of the invention. In either case, the offer selector 142 is provided a pool of available offers that may be selected for a program segment in the merchandising program being generated.

The offer selector 142 can be configured to use known techniques for selecting an offer from a pool of available offers and returning information as to the offer to the program engine 140. Those of ordinary skill in the art of statistics and computation will recognize a wide variety of algorithms that may be used for selecting an offer from a pool of available offers, one example of which is random or pseudorandom selection. Another exemplary selection algorithm is one that uses preprogrammed rules that direct the selection of an offer (e.g., a rule that states if the customer has previously purchased "X", then select an offer unrelated to "X"). A combination of random or pseudorandom selection with preprogrammed rules may also be used.

In a preferred embodiment of the invention, the offer selector 142 selects an offer based in whole or in part on information pertaining to the particular customer requesting the merchandising program. The customer information may be derived, for example, from the requesting customer's prior purchase history with the merchant. If the merchant knows that the customer previously purchased a particular item (which knowledge can be stored conventionally in a database in the merchant system 100), the offer selector 142 may be programmed to choose an item either related to or perhaps disparate from the previously purchased item.

Other customer information that may be used by the offer selector 142 may be derived, for example, from a "wish list" pertaining to the customer or from the customer's prior shopping history with the merchant. Many online merchants allow customers to maintain a personalized database, or "wish list," of goods and services that the customer would like to purchase. This "wish list" is stored in a memory in the merchant system 100. The customer is able to access this wish list at a later time to reconsider the prospect of buying the goods and services in the list. The offer selector 142 may be programmed to select an offer that relates to or, in fact, is an item on the customer's wish list. Alternatively, the offer selector 142 may be programmed to select an item that is disparate from items in the customer's wish list in order to expose the customer to other goods and services the customer may have not previously considered.

As to customer information derived from the customer's shopping history, it is possible for the merchant to maintain a database of information relating to prior customer experiences with the merchant, such as the types of goods and services previously viewed and for how long they were viewed by the customer. The longer that a customer has viewed information on a particular product or service may indicate greater interest by the customer in the product or service. The offer selector 142 may therefore be programmed to select such product, or a product relating thereto, for presentation to the customer.

In the embodiment of the invention shown in FIGS. 3 and 5, the program server 114 uses a probability engine 146 to assign weights to the offers in the pool of available offers. Where the offers are for goods or services, for example, the offer selector 142 selects a good or service for the offer in accordance with the weights assigned by the probability engine 146. The weights, typically numerical values, are designed to vary the probability of selection of the goods and services by the offer selector 142. Weights assigned to goods and services by the probability engine 146 can be stored separately in a memory for a short period of time, or may be stored with other information on the goods and services (e.g., in the catalog server 112) for a longer period of time.

The probability engine 146 may receive customer information, such as the customer's purchase history, wish list, or customer's shopping history, as previously discussed, and use this information to adjust the weights that are assigned to the pool of available offers. By virtue of greater weight being assigned to certain offers and lesser weight to other offers, the offer selector 142 can continue to use a measure of randomness in selecting the offer to be presented to the customer, with an influence resulting from the assigned weights.

The weights assigned by the probability engine 146 may be assigned in multiple stages. In one stage, a base weight may be assigned to the available offers based on the merchant's preference as to which offers should receive greater promotion. In another stage, additional weighting of the offers may be provided for individual customers in accordance with the customer information of the particular customer. Alternatively, the weighting of the offers may be based solely on the preferences of the merchant or on the customer information. Aggregate customer information (not identifiable with any particular customer) may also be used by the probability engine 146 when determining and assigning weights.

In another aspect of the invention, multiple classes may be defined with offers in the pool of available offers being identified as pertaining to at least one class. Where that is the case, the probability engine 146 may be configured to assign weights to offers based on the class to which the respective offers pertain. The weight of an offer may be adjusted based solely on customer information or may be adjusted based on customer information and the class to which the offer pertains. In this manner, the probability engine 146 has flexibility to enhance or diminish the probability of selection of a particular offer over other offers not pertaining to a particular class of interest.

Similarly, the probability engine 146 may assign a blanket weight to each class in the multiple classes, in which the weight of the class affects the probability of selection of all the offers that pertain to the respective class. This may be the entire weight given to a particular offer, or may simply comprise a base weight that is enhanced or diminished, as discussed earlier.

In any event, the offer selector 142 is configured to select an offer from the pool of available offers taking into account the weight assigned to the offers. Methods for selecting an offer from a pool of weighted offers are known in the field of statistics and computation (e.g., based on preprogrammed rules and/or random selection, as discussed earlier), and may be used by the offer selector 142 in this aspect of the invention.

In yet another aspect of the invention, the program server 114 may be configured to exclude offers from the pool of available offers that do not meet a defined criterion. One example of a defined criterion is a time frame in which the offer, if accepted, can be fulfilled. If, for example, a particular good or service cannot be shipped to a purchasing customer within a defined time frame, such as two weeks, the offer selector 142 may be configured to exclude those offers from the pool of available offers.

To carry out this aspect of the invention, the processing unit 130 of the program server 114 may execute computer program instructions comprising an availability monitor 144. The availability monitor 144 is charged with maintaining updated information as to the availability of offers in the pool of available offers. The availability monitor 144 initially determines whether a product is contained in inventory or is available from a distributor. When a product is unavailable (either sold out or unavailable from a distributor), the availability monitor 144 either excludes or signals to exclude the particular product from the pool of available offers until such time as the product becomes available. If a product is available, the availability monitor 144 may next estimate the time frame it will take for the product to be delivered to the customer. If the time frame for delivery of the product to the customer exceeds a threshold time frame (e.g., when a distributor is unable to fulfill product orders within a reasonable period of time), the availability monitor 144 either excludes or signals to exclude the particular product from the pool of available offers until such time as a threshold time frame for delivery can be met. This exclusion is done to improve the customer experience with the merchandising program by ensuring that ordered products are delivered in a timely manner. Preferably, the availability monitor 144 is configured so that threshold time frames for availability can be preprogrammed and/or later adjusted by the merchant as desired.

Other criteria may be defined for exclusion of offers from the pool of available offers. One such criterion may be a type of product or service. For example, a merchant may determine it does not wish to include product accessories in the pool of available offers. Customers may not be interested in buying a specialized replacement battery for a particular product, for instance, if they do not already own the product. The program server 114 may exclude such product accessories from the merchandising program being generated.

Another criterion for exclusion may be a defined class of product or service. As discussed earlier, multiple classes may be defined and offers in the pool of available offers may be identified as pertaining to at least one class in the multiple classes. The merchant may determine on a class-by-class basis whether products and services pertaining to that class should be excluded from selection for a merchandising program. This determination is added to the program instructions that operate the program server 114. Excluding certain classes altogether for different customers may provide an improved cross-shopping experience for the customers.

In the process of preparing a program segment, the program server 114 may use an interstitial segment engine 148 to prepare an interstitial program segment that is communicated to the program engine 140. The interstitial segment engine 148 may be programmed to include in an interstitial program segment one or more customer queries, a customer survey, game, diversion, etc., as previously discussed.

After the initial program segment is prepared at block 158 (FIG. 4), the program segment and its associated offer (or interstitial program segment, as the case may be) is forwarded to the shopping server 110 for presentation to the customer.

At block 160, the shopping server 110 determines whether the program segment is a regular program segment or an interstitial program segment. This may be accomplished by simply inspecting an information flag in the segment that identifies the type of segment. If it is an interstitial program segment, the shopping server proceeds to cause the interstitial information (e.g., customer query, survey, game, etc.) to be displayed to the customer at the customer device 102, 104, 106. This may be accomplished, for example, by providing an HTTP-formatted Web page document to a browser operating at the customer device.

Figure 7:
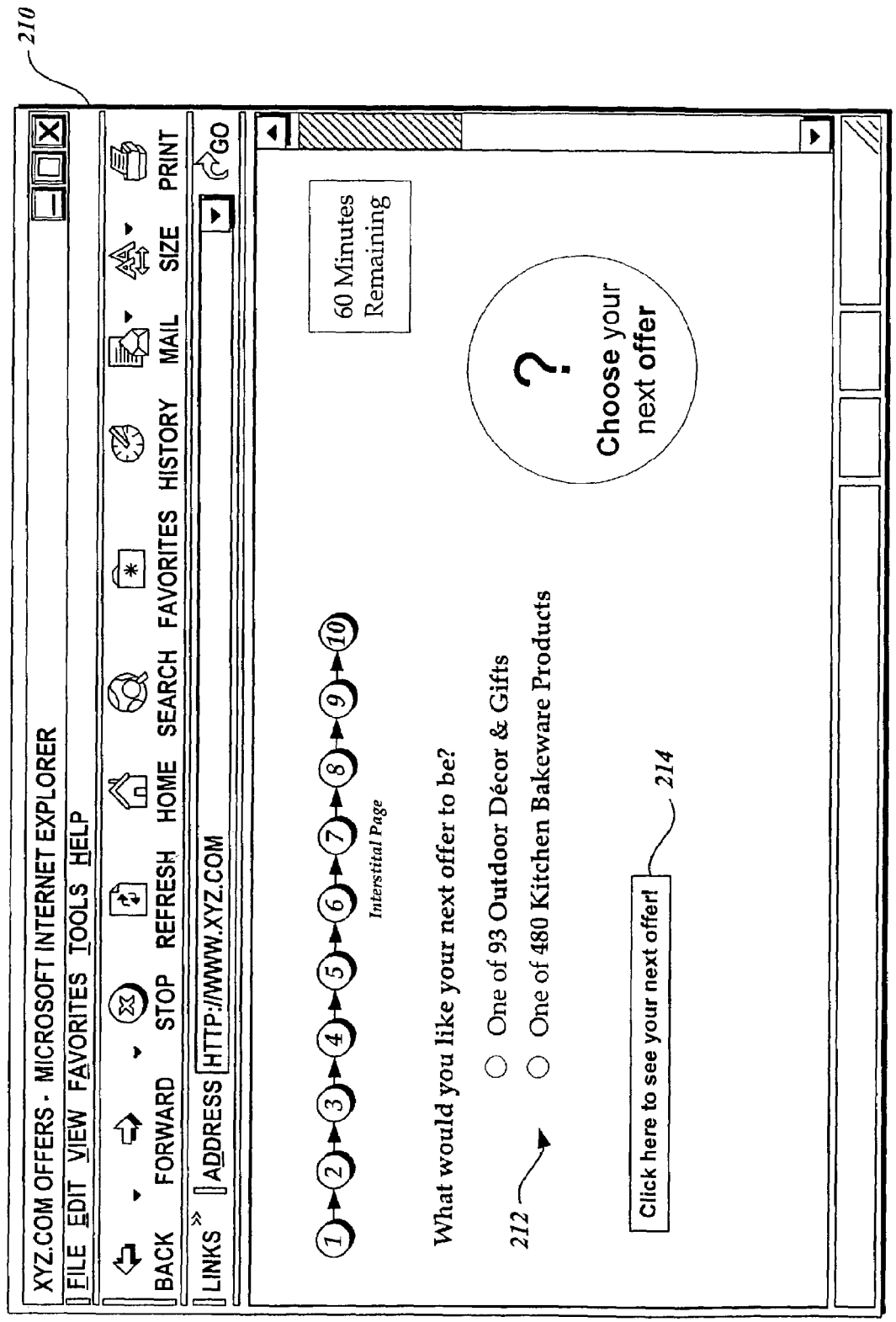
FIG. 7 is a depiction of a Web page presenting one exemplary interstitial program segment.

One possible interstitial segment page is depicted in a Web browser program 210 in FIG. 7. The interstitial segment page shown in FIG. 7 is configured with a "Choose your next offer" customer query. The example shown allows a customer to indicate at reference numeral 212 whether he or she would like to see one of "93 Outdoor Decor & Gifts" or "480 Kitchen Bakeware Products." The interstitial segment page may also be configured with a "Neither" choice on the page, which also provides the merchant information about the customer's interests. After the customer has selected one of the choices, the customer may click on a "See your next offer!" button 214.

When the customer provides a response, the customer response is returned to the shopping server 110. Typically, a customer response will include information that the merchant can use to improve the customer's shopping experience and perhaps store in a database for future reference, as discussed earlier. The shopping server 110 then proceeds to block 176 at which the shopping server 110 requests the program server 114 to prepare the next program segment.

Preparation of the next program segment at block 176 may be conducted in a manner as described earlier with respect to the initial program segment (block 158). The method 150 returns to block 160 at which the prepared program segment is forwarded to the shopping server 110, and the shopping server 110 again determines whether the program segment is a regular program segment or an interstitial program segment.

At decision block 160, if the program segment is a regular program segment, the shopping server 110 proceeds to block 164 and causes the offer in the program segment to be displayed to the customer. As with interstitial information in an interstitial program segment, an offer may be displayed to the customer by way of an HTTP-formatted Web page document that is communicated to a browser operating at the customer device 102, 104, 106.

Figure 6:
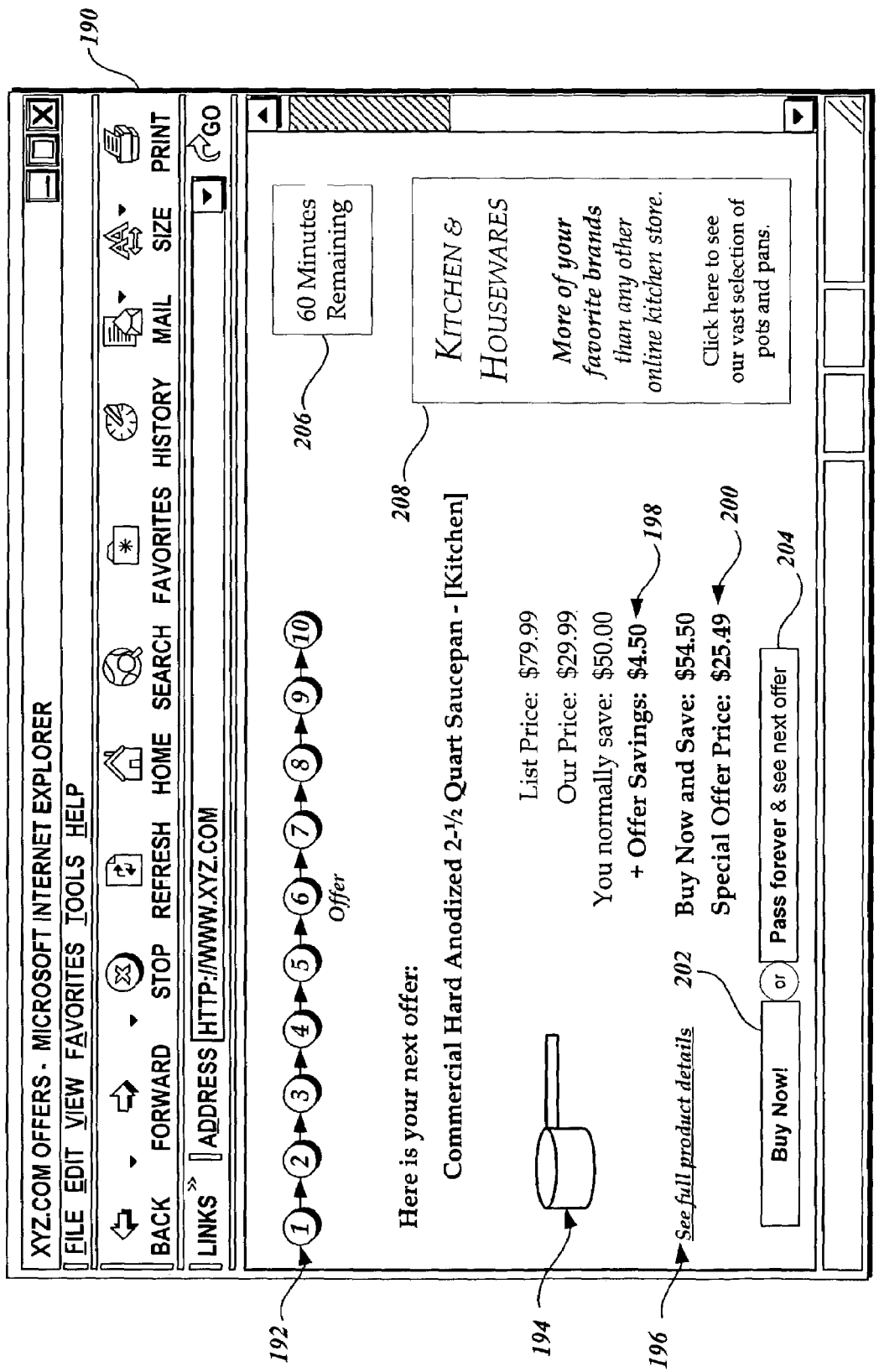
FIG. 6 is a depiction of a Web page presenting a merchandising program to a customer according to one exemplary embodiment of the invention.

One exemplary Web page document depicting an offer in a merchandising program is shown in FIG. 6. In FIG. 6, a Web browser program 190 is shown presenting the sixth of ten possible offers, as indicated by the merchandising program graphic 192. Along with text describing the offer (here a "commercial saucepan" that pertains to a "kitchen" class of goods), the Web page document may depict the actual goods, as indicated by the graphic 194. If desired, the Web document may also feature a hypertext link 196 to one or more separate Web pages that provide additional details on the offer. The Web document may additionally feature one or more advertisements that relate to (or are different from) the offer being presented. For example, in the representative Web document shown in FIG. 6, an advertisement 208 advertises the vast selection of pots and pans offered by the merchant in a kitchen class of goods.

In the example shown in FIG. 6, the offer is for a particular product with a merchandising benefit. At reference numeral 198, the customer is informed of the savings resulting from the offer. At reference numeral 200, the special offer price of the product is provided.

Finally, the customer is solicited for a response. Here, the customer may choose one of two actions: either to accept the offer by selecting a "Buy Now!" option 202 or decline the presented offer and see the next offer in the program by selecting option 204. In embodiments where the offer is subject to a time limitation to accept the offer, the Web page document may further provide an indication of the time remaining 206, which may be periodically updated as time progresses.

The shopping server 110 then awaits further input from the customer with respect to the offer. At decision block 166 (FIG. 4), if the customer accepts the displayed offer within the indicated time frame (if applicable), the shopping server 110 proceeds to block 168 and allows the customer's acceptance to be processed. Methods and systems for processing customer purchases are well known in the art of electronic commerce and may be employed in this aspect of the merchant system 100.

At the same time or after processing the customer's acceptance, the shopping server 110 proceeds to block 170 and terminates the merchandising program that was being presented to the customer, after which the customer is returned to a regular shopping environment.

If, at block 166, the customer declines the displayed offer, the shopping server 110 proceeds to block 172 and withdraws the current offer, making it no longer available for acceptance. At decision block 174, the shopping server 110 then determines whether the current offer being displayed pertains to the last program segment in the merchandising program. The shopping server 110 may accomplish this by being instructed beforehand as to how many program segments are in a merchandising program and keeping track of the number of segments that have been presented. Alternatively, the shopping server 110 may query the program server 114 to determine whether the merchandising program is at the last program segment. In any case, if the current (declined) offer pertains to the last program segment in the merchandising program, the shopping server proceeds to block 170 at which it terminates the merchandising program and returns the customer to a regular shopping environment.

If, at block 174, the shopping server 110 determines that the displayed offer does not pertain to the last program segment, the shopping server proceeds to block 176 and causes the program server 114 to prepare the next program segment in the merchandising program. Again, as noted earlier, preparation of a program segment at block 176 may be conducted in a manner as earlier described with respect to block 158. When the next program segment is prepared, the shopping server 110 returns to block 160 and proceeds as previously described.

Additional features of the invention that may be employed by the merchant includes the possibility of presenting an offer to a customer in which the offer includes an option for the customer to transfer the offer to another party for possible acceptance by the other party. For example, the offer may be for a product or service that the customer does not wish to purchase, but the customer knows someone else who would like to accept the offer. The program engine 140 in the program server 114 may be configured to receive input from the customer that identifies the other party to whom the customer wishes to transfer the offer. The customer input may be an account name or number or email address, etc. that identifies the other party to whom the offer is to be transferred. The program server 114 and/or shopping server 110 may be configured to terminate the customer's merchandising program when an offer has been transferred to another party. Alternatively, the program server 114 and/or shopping server 110 may be configured to continue presenting the merchandising program to the customer after the customer has transferred an offer to another party.

In circumstances where an offer has been transferred to another party, the merchant system 100 may be configured to require the other party to accept or decline the offer within the original time limit given to the transferring customer. Alternatively, the merchant system 100 may be configured to initiate a new time limit for the other party once the other party views the transferred offer. Should the other party decline the presented offer, the offer is withdrawn and can no longer be accepted by the other party. In yet another embodiment, the "transfer" of an offer to another party may be configured to include sharing the offer such that the offer becomes available to both the customer and the other party to accept or decline.

In a further embodiment of the invention, the customer may be presented with two or more offers, e.g., side-by-side, and for each merchandising program segment, the customer decides whether to accept or decline at least one of the presented offers. If an offer is declined, the declined offer is withdrawn and replaced by an offer in a subsequent program segment. In this manner, the customer does not have to make an immediate purchase decision as to an offer, but may carry forward a presented offer and compare it to other offers in program segments that remain in the merchandising program.

Much of the discussion above is provided in the context of an offer being a product or service. As noted earlier, an offer may also be a merchandising benefit, such as a reduction of price in some specified percentage or amount. When an offer of this type is presented to the customer, the offer may be further configured to allow the customer at that time to select the product or service to be subject to the merchandising benefit. In that regard, a limited set of products or services may be presented to the customer for selection. Alternatively, the customer may be enabled to select any product or service from a particular class of product or service, or perhaps from the entire catalog of products or services provided by the merchant.

An "impressions to exhaust" feature may further be employed in embodiments of the present invention. For this feature, the merchant may instruct the program server 114 with the number of times that a particular offer can be presented to customers in a merchandising program. The program server 114 is configured, e.g., by way of the program instructions comprising the program engine 140, to count the number of times that a particular offer is presented to customers. After the offer has been presented to customers the predetermined number of times (i.e., the number of impressions is exhausted), the program server 114 thereafter excludes the offer from presentation to further customers.

A "units sold to exhaust" feature may also be employed in embodiments of the present invention. For this feature, the merchant may instruct the program server 114 with the number of times that a particular product or service (that is subject to an offer) can be presented to customers. For example, the merchant may select a product for an extremely steep discount (or offer it for free) in a limited number to its customers. Which customers receive the special offer may depend on the probability of the offer being selected in any one merchandising program. In any event, the program server 114 may be programmed to count the number of times that the special offer is accepted by customers, and after the offer has been accepted by customers the predetermined number of times, the offer is thereafter excluded by the program server 114 from further presentation to customers.

While several embodiments of the invention have been illustrated and described above, it will be appreciated that various changes can be made therein without departing from the spirit and scope of the invention. For example, the steps and operations described above as being performed by the program server 114 may equally be performed by the shopping server 110 and/or catalog server 112, and vice versa. The program server 114, shopping server 110, and/or catalog server 112 may be integrated into a single computing device, where desired. The catalog server 112 may also undertake operations, such as pre-selecting offers for inclusion in the database 182. The scope of the invention should therefore be determined from the following claims and equivalents thereto.

The invention claimed is:

1. A computer-implemented method for presenting an interactive time-limited merchandising program to a customer, comprising:

preparing a merchandising program having two or more segments organized in a series, each segment in the series having at least one time-limited offer for presentation to the customer, wherein the at least one offer is for customer purchase of a product or service, sequentially presenting the program segments to the customer via a presentation medium, wherein for each presented segment in the series, the at least one offer is presented for the customer to decide whether to accept or decline the at least one offer without knowing the identity of further offers in program segments yet to be presented;

receiving input indicating whether the customer has accepted the at least one offer;

when the input indicates that the at least one offer has been accepted by the customer within the time limit of the offer, then, as a result of the customer's acceptance of the at least one offer, automatically terminating the merchandising program without presenting any further offers from the merchandising program to the customer and, for the product or service in the accepted offer, automatically processing the customer's purchase of the product or service via the same presentation medium; and when the at least one offer has not been accepted by the customer, then withdrawing the offer.

2. The method of claim 1, wherein when the at least one offer has not been accepted by the customer, the method further comprises presenting at least one offer in the next program segment in the series.

3. The method of claim 1, wherein if the offer is withdrawn and no program segment in the series remains, the method further comprises terminating the merchandising program.

4. The method of claim 1, wherein one or more program segments in the series are prepared after an offer in an earlier-prepared program segment has been presented to a customer.

5. The method of claim 1, further comprising selecting an offer for a program segment from a pool of available offers.

6. The method of claim 5, wherein the offer is selected for the program segment based on information pertaining to the customer.

7. The method of claim 6, wherein the customer information is derived from the customer's purchase history.

8. The method of claim 6, wherein the customer information is derived from a wish list pertaining to the customer.

9. The method of claim 6, wherein the customer information is derived from the customer's shopping history.

10. The method of claim 5, further comprising assigning weights to offers in the pool of available offers, wherein the weights vary a probability of selection of an offer for a program segment.

11. The method of claim 10, further comprising adjusting the weight of an offer based on information pertaining to the customer.

12. The method of claim 5, further comprising defining multiple classes and identifying an offer in the pool of available offers as pertaining to at least one class in the multiple classes.

13. The method of claim 12, further comprising assigning weights to offers in the pool of available offers, wherein the weights vary a probability of selection of an offer for a program segment.

14. The method of claim 13, further comprising adjusting the weight of an offer based on information pertaining to the customer and the class to which the offer pertains.

15. The method of claim 12, further comprising assigning a weight to each class in the multiple classes, wherein the weights provide a variable probability of selection to the offers pertaining to the respective classes.

16. The method of claim 15, further comprising adjusting the weight of a class based on information pertaining to the customer.

17. The method of claim 5, further comprising configuring the pool of available offers to exclude offers that do not meet a defined criterion.

18. The method of claim 17, wherein the defined criterion is a time frame in which the offer, if accepted, can be fulfilled.

19. The method of claim 17, wherein the defined criterion is a type of product or service.

20. The method of claim 17, wherein the defined criterion is a class of product or service.

21. The method of claim 1, further comprising preparing an interstitial segment and including the interstitial segment in the series of program segments, wherein the interstitial segment is configured to present interstitial information to the customer and solicit a customer response.

22. The method of claim 21, further comprising, when the interstitial segment is presented, querying the customer regarding one or more offers the customer would like to receive.

23. The method of claim 21, further comprising, when the interstitial segment is presented, asking whether the customer would like to preview an offer in a program segment yet to be presented.

24. The method of claim 23, wherein the preview presents the offer without initiating the time limitation of the offer.

25. The method of claim 23, further comprising defining multiple classes and identifying offers in the program segments as pertaining to at least one class in the multiple classes, and when the interstitial segment is presented, asking the customer to select the class of an offer for a program segment yet to be presented.

26. The method of claim 25, wherein the interstitial segment further provides a preview of the offer in the selected class without initiating the time limitation of the offer.

27. The method of claim 21, further comprising, when the interstitial segment is presented, asking whether the customer would like to reactivate an offer in a program segment that was previously presented.

28. The method of claim 27, further comprising enabling the customer to select the previously-presented offer to be reactivated.

29. The method of claim 1, further comprising defining multiple classes and identifying offers in the program segments as pertaining to at least one class in the multiple classes, and wherein the at least one offer in a program segment includes a reduction of price of products or services in a particular class.

30. The method of claim 1, wherein the at least one offer in a program segment includes a reduction of price of the product or service.

31. The method of claim 30, further comprising enabling the customer to select the product or service subject to the offer.

32. The method of claim 31, further comprising presenting multiple products or services to the customer for selection by the customer to be the product or service subject to the offer.

33. The method of claim 30, wherein the at least one offer includes a percentage reduction of price.

34. The method of claim 30, wherein the at least one offer includes an amount reduction of price.

35. The method of claim 1, further comprising counting the number of times an offer is presented to customers, and after the offer has been presented a predetermined number of times, excluding the offer from presentation to further customers.

36. The method of claim 1, further comprising counting the number of times a product or service that is subject to an offer is accepted by customers, and after the offer for the product or service has been accepted by customers a predetermined number of times, excluding the offer from presentation to further customers.

37. The method of claim 1, wherein the at least one offer presented to the customer includes an option for the customer to transfer the at least one offer to another party for possible acceptance of the offer by the other party.

38. The method of claim 37, wherein the other party's acceptance must be made within the original time limit given to the transferring customer.

39. The method of claim 37, wherein a new time limit is initiated for the other party once the other party views the transferred offer.

40. The method of claim 1, wherein two or more offers are simultaneously presented to the customer, and for each program segment in the series, the offers are presented for the customer to decide whether to accept or decline at least one of the presented offers, and if an offer is declined, the declined offer is replaced by a further offer in a subsequent program segment.

41. The method of claim 40, wherein if an offer is declined, the one or more non-declined offers remain presented to the customer while the declined offer is replaced.

42. A computer system for presenting an interactive time-limited merchandising program to a customer, comprising a computer with operable components that cause the computer to:
   prepare a merchandising program having two or more segments organized in a series, each program segment having at least one time-limited offer selected from offers available for presentation to the customer, wherein the at least one offer is for customer purchase of a product or service;
   sequentially present the program segments to the customer via a presentation medium such that, for each presented segment in the series, the computer requires input indicating whether the customer accepts or declines the at least one offer without revealing the identity of further offers in program segments yet to be presented, and
   when the input indicates that the at least one offer is declined by the customer, the components cause the computer to:
      withdraw the at least one offer; and
      present at least one offer in the next program segment in the series to the customer via the presentation medium; and
   when the input indicates that the at least one offer is accepted within the time limit of the offer, as a result of the customer's acceptance of the offer, the components cause the computer to:
      automatically terminate the merchandising program without presenting any further offers from the merchandising program to the customer; and
      automatically process the customer's purchase of the product or service in the accepted offer via the same presentation medium.

43. The computer system of claim 42, wherein the computer is configured to prepare all program segments in the series at one time.

44. The computer system of claim 42, wherein the computer is configured to prepare an offer in the series of program segments after an offer in an earlier-prepared program segment in the series has been presented to the customer.

45. The computer system of claim 42, wherein the computer is further configured to select an offer for a program segment from a pool of available offers.

46. The computer system of claim 45, wherein the computer is configured to select the offer based on information pertaining to the customer.

47. The computer system of claim 45, wherein the computer is further configured to assign weights to offers in the pool of available offers, in which the weights vary the probability that an offer will be selected for a program segment.

48. The computer system of claim 47, wherein the computer is further configured to adjust the weight of an offer based on information pertaining to the customer.

49. The computer system of claim 47, wherein the computer is further configured to adjust the weight of an offer based on a class to which the offer pertains.

50. The computer system of claim 47, wherein the computer is further configured to exclude from the pool of available offers those offers that do not meet a defined criterion.

51. The computer system of claim 50, wherein the defined criterion is a time frame in which the offer, if accepted, can be fulfilled.

52. The computer system of claim 50, wherein the defined criterion is a type of product or service.

53. The computer system of claim 50, wherein the defined criterion is a class of product or service.

54. The computer system of claim 42, wherein the computer is further configured to prepare an interstitial segment and include the interstitial segment in the series of program segments, wherein the interstitial segment is configured to solicit a customer response.

55. The computer system of claim 54, wherein the interstitial segment is configured to query the customer regarding one or more offers the customer would like to receive.

56. The computer system of claim 54, wherein the interstitial segment is configured to ask the customer to select a characteristic of an offer in a program segment yet to be presented.

57. The computer system of claim 54, wherein the interstitial segment is configured to ask whether the customer would like to reactivate an offer in a program segment that was previously presented.

58. The computer system of claim 57, wherein the computer is configured to receive a response from the customer, and wherein an affirmative customer response results in reactivating the previously-presented offer and presenting the offer to the customer for a limited time.

59. The computer system of claim 57, wherein the computer is further configured to enable the customer to select the previously-presented offer to be reactivated.

60. The computer system of claim 41, wherein the computer is further configured to count the number of times an offer is presented to customers, and after the offer has been presented a predetermined number of times, the computer excludes the offer from presentation to further customers.

61. The computer system of claim 41, wherein the computer is further configured to count the number of times an offer for a product or service is accepted by customers, and after the offer for the product or service has been accepted by customers a predetermined number of times, the computer excludes the offer from presentation to further customers.

62. The computer system of claim 42, wherein the computer is configured to provide the customer an option to transfer the at least one offer to another party for possible acceptance of the offer by the other party.

63. The computer system of claim 42, wherein the computer is configured to simultaneously present two or more offers to the customer, and for each presented segment in the series, the computer requires input indicating whether the customer accepts or declines at least one of the presented offers, and if an offer is declined, the computer replaces the declined offer with a further offer in a subsequent program segment.

64. The computer system of claim 63, wherein if an offer is declined, the computer is configured to continue presenting one or more non-declined offers while replacing the declined offer.

65. A computer-readable medium having computer program instructions stored thereon, which, when executed by a processing unit, result in:

sequentially presenting time-limited offers in a merchandising program to a customer via a presentation medium, said merchandising program having two or more program segments organized in a series, each program segment in the series having at least one time-limited offer for presentation to the customer, wherein the offers are for customer purchase of a product or service, and wherein the offers are presented for the customer to accept or decline without knowing the identity of further offers in the program segments yet to be presented;

receiving input indicating whether a presented offer has been accepted by the customer;

when the input indicates that a presented offer has been accepted by the customer, then, as a result of the customer's acceptance of the offer, automatically terminating the merchandising program without presenting any further offers from the merchandising program to the customer, and for the product or service in the accepted offer, automatically processing the customer's purchase of the product or service via the same presentation medium; and when a presented offer has not been accepted by the customer, then withdrawing the offer.

66. The computer-readable medium of claim 65, wherein when a presented offer has not been accepted by the customer, the computer-implemented instructions further result in presenting the next offer in the merchandising program.

67. The computer-readable medium of claim 66, wherein if the offer is withdrawn and no program segment in the series remains, the computer-implemented instructions further result in terminating the merchandising program.

68. The computer-readable medium of claim 65, wherein the computer-implemented instructions further result in preparing one or more program segments after an offer in an earlier-prepared program segment has been presented to the customer.

69. The computer-readable medium of claim 65, further comprising instructions stored thereon, which, when executed by a processing unit, result in selecting an offer for a program segment from a pool of available offers.

70. The computer-readable medium of claim 69, wherein the instructions, when executed, result in selecting the offer based on information pertaining to the customer.

71. The computer-readable medium of claim 70, wherein the customer information is derived from the customer's purchase history.

72. The computer-readable medium of claim 70, wherein the customer information is derived from a wish list pertaining to the customer.

73. The computer-readable medium of claim 70, wherein the customer information is derived from the customer's shopping history.

74. The computer-readable medium of claim 69, wherein the computer-implemented instructions further result in assigning weights to offers in the pool of available offers, in which the weights vary the probability that an offer will be selected for a program segment.

75. The computer-readable medium of claim 74, wherein the computer-implemented instructions further result in adjusting the weight of an offer based on information pertaining to the customer.

76. The computer-readable medium of claim 69, further comprising instructions stored thereon, which, when executed by a processing unit, result in defining multiple classes and identifying an offer in the pool of available offers as pertaining to at least one class in the multiple classes.

77. The computer-readable medium of claim 76, wherein the computer-implemented instructions further result in assigning weights to offers in the pool of available offers, in which the weights vary the probability that an offer will be selected for a program segment.

78. The computer-readable medium of claim 77, wherein the computer-implemented instructions further result in adjusting the weight of an offer based on information pertaining to the customer and the class to which the offer pertains.

79. The computer-readable medium of claim 76, wherein the computer-implemented instructions further result in assigning a weight to each class in the multiple classes, in which the weights provide a variable probability of selection to the offers pertaining to the respective classes.

80. The computer-readable medium of claim 79, wherein the computer-implemented instructions further result in adjusting the weight of a class based on information pertaining to the customer.

81. The computer-readable medium of claim 69, further comprising instructions stored thereon, which, when executed by a processing unit, result in configuring the pool of available offers to exclude offers that do not meet a defined criterion.

82. The computer-readable medium of claim 81, wherein the defined criterion is a time frame in which the offer, if accepted, can be fulfilled.

83. The computer-readable medium of claim 81, wherein the defined criterion is a type of product or service.

84. The computer-readable medium of claim 81, wherein the defined criterion is a class of product or service.

85. The computer-readable medium of claim 65, further comprising instructions stored thereon, which, when executed by a processing unit, result in preparing an interstitial segment and including the interstitial segment in the series of program segments, wherein the interstitial segment is configured to solicit a customer response.

86. The computer-readable medium of claim 85, wherein the interstitial segment, when presented, queries the customer regarding one or more offers the customer would like to receive.

87. The computer-readable medium of claim 85, wherein the interstitial segment, when presented, asks whether the customer would like to preview an offer in a program segment yet to be presented.

88. The computer-readable medium of claim 87, wherein the preview presents the offer without initiating a time limitation on the offer.

89. The computer-readable medium of claim 87, further comprising instructions stored thereon, which, when executed by a processing unit, result in defining multiple classes and identifying the offers in the program segments as pertaining to at least one class in the multiple classes, and wherein the interstitial segment, when presented, asks the customer to select the class of an offer in a program segment yet to be presented.

90. The computer-readable medium of claim 89, wherein the interstitial segment further provides a preview of the offer in the selected class without initiating a time limitation on the offer.

91. The computer-readable medium of claim 85, wherein the interstitial segment, when presented, asks whether the customer would like to reactivate an offer in a program segment that was previously presented.

92. The computer-readable medium of claim 91, further comprising instructions stored thereon, which, when executed by a processing unit, result in enabling the customer to select the previously-presented offer to be reactivated.

93. The computer-readable medium of claim 65, further comprising instructions stored thereon, which, when executed by a processing unit, result in defining multiple classes and identifying offers in the program segments as pertaining to at least one class in the multiple classes, and wherein an offer in a program segment includes a reduction of price of products or services in a particular class.

94. The computer-readable medium of claim 65, wherein an offer in a program segment includes a reduction of price of the product or service.

95. The computer-readable medium of claim 94, further comprising instructions stored thereon, which, when executed by a processing unit, result in enabling the customer to select the product or service subject to the offer.

96. The computer-readable medium of claim 95, wherein the computer-implemented instructions further result in presenting multiple products or services to the customer for selection by the customer to be the product or service subject to the offer.

97. The computer-readable medium of claim 94, wherein the offer includes a percentage reduction of price.

98. The computer-readable medium of claim 94, wherein the offer includes an amount reduction of price.

99. The computer-readable medium of claim 65, further comprising instructions stored thereon, which, when executed by a processing unit, result in counting the number of times an offer is presented to customers, and after the offer has been presented a predetermined number of times, excluding the offer from presentation to further customers.

100. The computer-readable medium of claim 65, further comprising instructions stored thereon, which, when executed by a processing unit, result in counting the number of times a product or service subject to an offer is accepted by customers, and after the offer for the product or service has been accepted by customers a predetermined number of times, excluding the offer from presentation to further customers.

101. The computer-readable medium of claim 65, wherein the computer-implemented instructions further result in presenting an offer to the customer that includes an option for the customer to transfer the offer to another party for possible acceptance of the offer by the other party.

102. The computer-readable medium of claim 101, wherein the other party's acceptance must be made within a time limit originally given to the transferring customer.

103. The computer-readable medium of claim 101, wherein the computer-implemented instructions further result in initiating a time limit for the other party to accept the transferred offer once the other party views the offer.

104. The computer-readable medium of claim 65, wherein the computer-implemented instructions result in simultaneously presenting two or more offers to the customer, wherein the offers are presented for the customer to decide whether to accept or decline at least one of the presented offers, and further if an offer is declined, the computer-implemented instructions replace the declined offer with a further offer in a subsequent program segment.

105. The computer-readable medium of claim 104, wherein if an offer is declined, the computer-implemented instructions cause one or more non-declined offers to remain presented to the customer while the declined offer is replaced.

\* \* \* \* \*